United States Patent
Cheng et al.

(10) Patent No.: US 9,042,126 B2
(45) Date of Patent: May 26, 2015

(54) SWITCHING POWER CONVERTING APPARATUS, SWITCHING CONTROLLER FOR THE SAME, AND METHOD OF CONTROLLING A BIPOLAR JUNCTION TRANSISTOR OF THE SAME

(71) Applicants: Jung-Pei Cheng, Huatan Township, Changhua County (TW); Yu-Chang Chen, JiJi Township, Nantou County (TW); Jiun-Hung Pan, Wenshan Dist., Taipei (TW); Yung-Chih Lai, Miaoli, Miaoli County (TW); Isaac Y. Chen, Zhubei, Hsinchu County (TW); Chien-Fu Tang, East Dist., Hsinchu (TW); Jyun-Che Ho, Xikou Township, Chiayi County (TW)

(72) Inventors: Jung-Pei Cheng, Huatan Township, Changhua County (TW); Yu-Chang Chen, JiJi Township, Nantou County (TW); Jiun-Hung Pan, Wenshan Dist., Taipei (TW); Yung-Chih Lai, Miaoli, Miaoli County (TW); Isaac Y. Chen, Zhubei, Hsinchu County (TW); Chien-Fu Tang, East Dist., Hsinchu (TW); Jyun-Che Ho, Xikou Township, Chiayi County (TW)

(73) Assignee: RICHTEK TECHNOLOGY CORP., Hsinchu (TW)

( * ) Notice: Subject to any disclaimer, the term of this patent is extended or adjusted under 35 U.S.C. 154(b) by 157 days.

(21) Appl. No.: 13/847,795

(22) Filed: Mar. 20, 2013

(65) Prior Publication Data
US 2014/0286057 A1 Sep. 25, 2014

(30) Foreign Application Priority Data

Jan. 7, 2013 (TW) .............................. 102100424 A

(51) Int. Cl.
*H02M 3/335* (2006.01)
*H02M 1/08* (2006.01)
*H02M 1/00* (2006.01)

(52) U.S. Cl.
CPC ............ *H02M 3/33523* (2013.01); *H02M 1/08* (2013.01); *H02M 2001/0006* (2013.01); *H02M 2001/0048* (2013.01); *Y02B 70/1491* (2013.01)

(58) Field of Classification Search
CPC ......................... H02M 3/335; H02M 3/33507
USPC ............................................. 363/21.12–21.18
See application file for complete search history.

(56) References Cited

U.S. PATENT DOCUMENTS

2010/0202165 A1* 8/2010 Zheng et al. ................ 363/21.13
2014/0233269 A1* 8/2014 Feng et al. .................. 363/21.12

\* cited by examiner

*Primary Examiner* — Adolf Berhane
*Assistant Examiner* — Yemane Mehari
(74) *Attorney, Agent, or Firm* — Andrew F. Young, Esq.; Lackenbach Siegel, LLP

(57) ABSTRACT

A switching power converting apparatus includes a coil unit, a bipolar junction transistor (BJT) controlling power transfer through the coil unit, and a current sensing resistor sensing a current flowing through the BJT so as to produce a sensed voltage thereacross. A switching controller includes a current source supplying a first current, a current generating module generating, based on an input voltage associated with the sensed voltage, a second current, which is proportional to the current flowing through the BJT, a multiplexing module selecting one of the first and second currents as an output current, and a driving module outputting, based on the output current, a driving current, which is proportional to the output current, to the BJT to thereby conduct the BJT.

15 Claims, 12 Drawing Sheets

SWITCHING POWER CONVERTING APPARATUS, SWITCHING CONTROLLER FOR THE SAME, AND METHOD OF CONTROLLING A BIPOLAR JUNCTION TRANSISTOR OF THE SAME

CROSS-REFERENCE TO RELATED APPLICATION

This application claims priority of Taiwanese Application No. 102100424, filed on Jan. 7, 2013.

BACKGROUND OF THE INVENTION

1. Field of the Invention

This invention relates to switching power converting techniques, and more particularly to a switching power converting apparatus, a switching controller for the same, and a method of controlling a bipolar junction transistor of the same.

2. Description of the Related Art

Referring to FIGS. 1 and 2, U.S. Patent Application Publication No. 2010/0202165 discloses a conventional flyback switching power converting apparatus that uses switching of a bipolar junction transistor (BJT) 11 between conduction and non-conduction to control power transfer from a power source 12 to a load 13 through a transformer 14. However, the conventional switching power converting apparatus utilizes a constant base current of the BJT 11 during a time period from t2 to t3, thereby resulting in higher power consumption.

SUMMARY OF THE INVENTION

Therefore, the object of the present invention is to provide a switching power converting apparatus, a switching controller for the same, and a method of controlling a bipolar junction transistor of the same that can overcome the aforesaid drawback associated with the prior art.

According to one aspect of this invention, a switching power converting apparatus comprises a coil unit, a bipolar junction transistor (BJT), a current sensing resistor, and a switching controller.

The coil unit is adapted to be coupled between a power source and a load.

The BJT is coupled to the coil unit and is operable to control power transfer from the power source to the load through the coil unit in response to conduction or non-conduction of the BJT. The BJT permits a conducting current to flow therethrough during conduction.

The current sensing resistor is adapted to be coupled between the power source and the BJT for sensing the conducting current flowing through the BJT so as to produce a sensed voltage across the current sensing resistor.

The switching controller is coupled between the current sensing resistor and the BJT. The switching controller includes a current source, a current generating module, a multiplexing module and a driving module. The current source supplies a first current. The current generating module is operable to generate, based on an input voltage associated with the sensed voltage, a second current proportional to the conducting current flowing through the BJT. The multiplexing module is coupled to the current source and the current generating module. The multiplexing module is operable to select one of the first and second currents respectively from the current source and the current generating module as an output current in response to a selection control signal. The driving module is coupled between the multiplexing module and the BJT. The driving module is operable to output to the BJT a driving current that is proportional to the output current based on the output current from the multiplexing module. The BJT conducts upon receiving the driving current from the driving module.

According to another aspect of this invention, there is provided a switching controller for a switching power converting apparatus. The switching power converting apparatus includes a coil unit, a bipolar junction transistor (BJT), and a current sensing resistor. The BJT is coupled to the coil unit for controlling power transfer from a power source to a load through the coil unit in response to conduction or non-conduction of the BJT. The BJT permits a conducting current to flow therethrough during conduction. The current sensing resistor is coupled to the BJT for sensing the conducting current flowing through the BJT so as to produce a sensed voltage across the current sensing resistor.

The switching controller of this invention is adapted to be coupled between the BJT and the current sensing resistor, and comprises a current source, a current generating module, a multiplexing module, and a driving module.

The current source supplies a first current.

The current generating module is operable to generate, based on an input voltage associated with the sensed voltage, a second current proportional to the conducting current flowing through the BJT.

The multiplexing module is coupled to the current source and the current generating module. The multiplexing module is operable to select one of the first and second currents respectively from the current source and the current generating module as an output current in response to a selection control signal.

The driving module is coupled between the multiplexing module and the BJT. The driving module is operable to output to the BJT a driving current that is proportional to the output current based on the output current from the multiplexing module such that the BJT conducts upon receiving the driving current from the driving module.

According to yet another aspect of this invention, there is provided a method of controlling a bipolar junction transistor (BJT) of a switching power converting apparatus. Switching of the BJT between conduction and non-conduction is related to power transfer of the switching power converting apparatus. The BJT permits a conducting current to flow therethrough during conduction. The method of this invention comprises the steps of:

(a) supplying a predetermined voltage to the BJT via a first conducting path to make the BJT non-conducting;

(b) supplying a constant first current to the BJT to make the BJT conducting; and (c) supplying a second current to the BJT to make the BJT conducting, the second current being in phase with the first current and being proportional to the conducting current flowing through the BJT.

BRIEF DESCRIPTION OF THE DRAWING

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
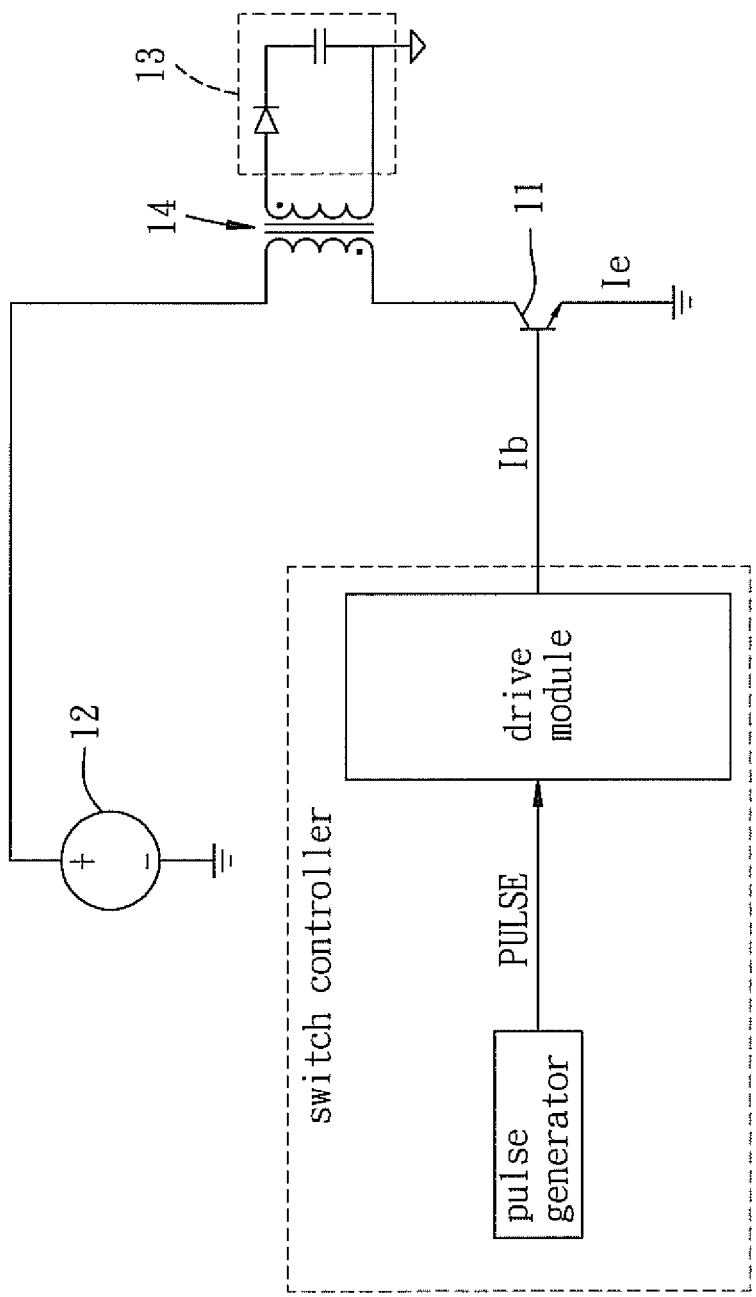
FIG. 1 is a schematic circuit diagram illustrating a conventional switching power converting apparatus.
Figure 2:
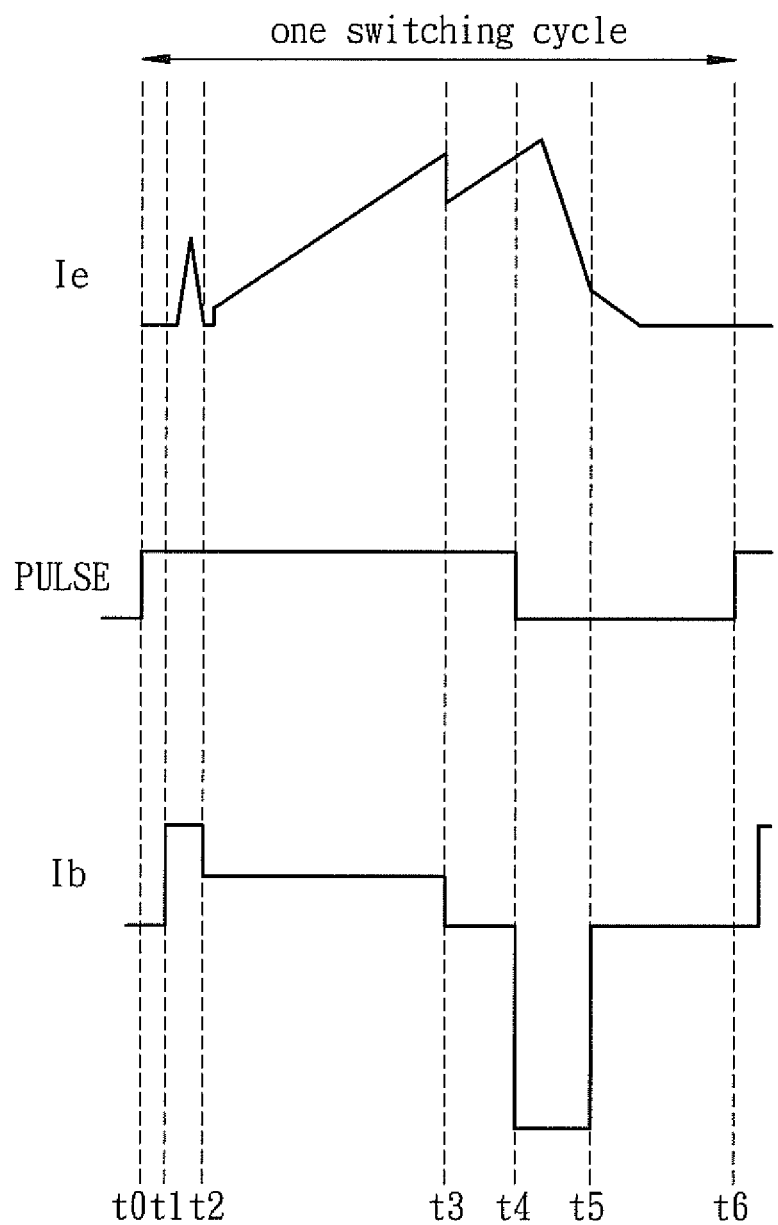
FIG. 2 is a timing diagram illustrating an emitter current (Ie), a pulse signal (PULSE) and a base current (Ib) of the conventional switching power converting apparatus.

Before the present invention is described in greater detail, it should be noted that like elements are denoted by the same reference numerals throughout the disclosure.

Figure 3:
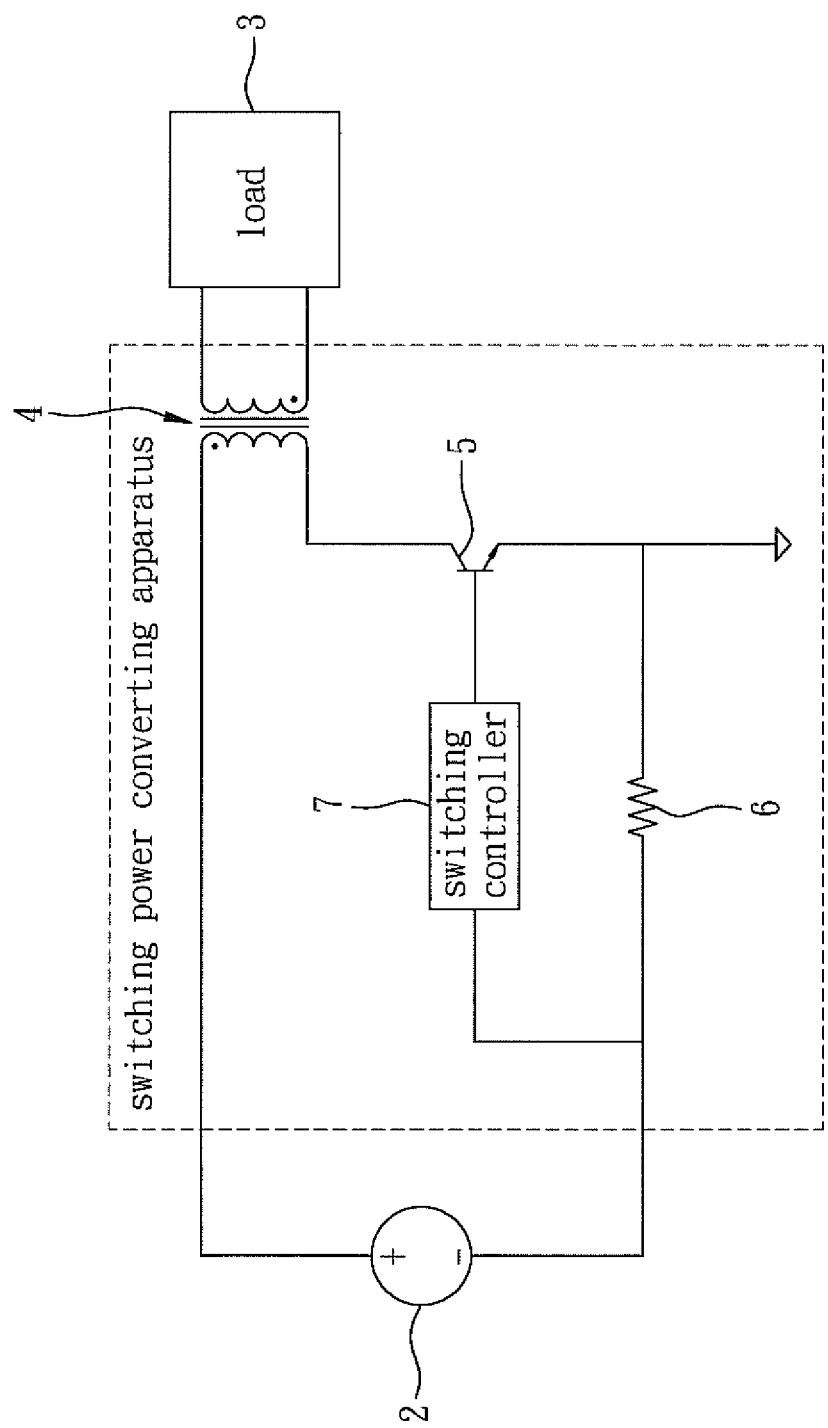
FIG. 3 is a schematic circuit diagram illustrating the first preferred embodiment of a switching power converting apparatus according to this invention.

Referring to FIG. 3, the first preferred embodiment of a switching power converting apparatus according to this invention is a flyback switching power converting apparatus, and includes a coil unit 4, a bipolar junction transistor (BJT) 5, a current sensing resistor 6, and a switching controller 7. The coil unit 4 is a transformer in this embodiment, and is adapted to be coupled between a power source 2 and a load 3. The BJT 5 is an NPN BJT in this embodiment, and has a base, a collector coupled to the coil unit 4, and a grounded emitter. The BJT 5 is operable to control power transfer from the power source 2 to the load 3 through the coil unit 4 in response to conduction or non-conduction thereof. The BJT 5 allows a conducting current to flow therethrough during conduction. The current sensing resistor 6 is adapted to be coupled between the power source 2 and the BJT 5 for sensing the conducting current flowing through the BJT 5 so as to produce a sensed voltage across the current sensing resistor 6. In this embodiment, the current sensing resistor 6 has a first terminal coupled to the emitter of the BJT 5, and a second terminal adapted to be coupled to the power source 2.

Figure 4:
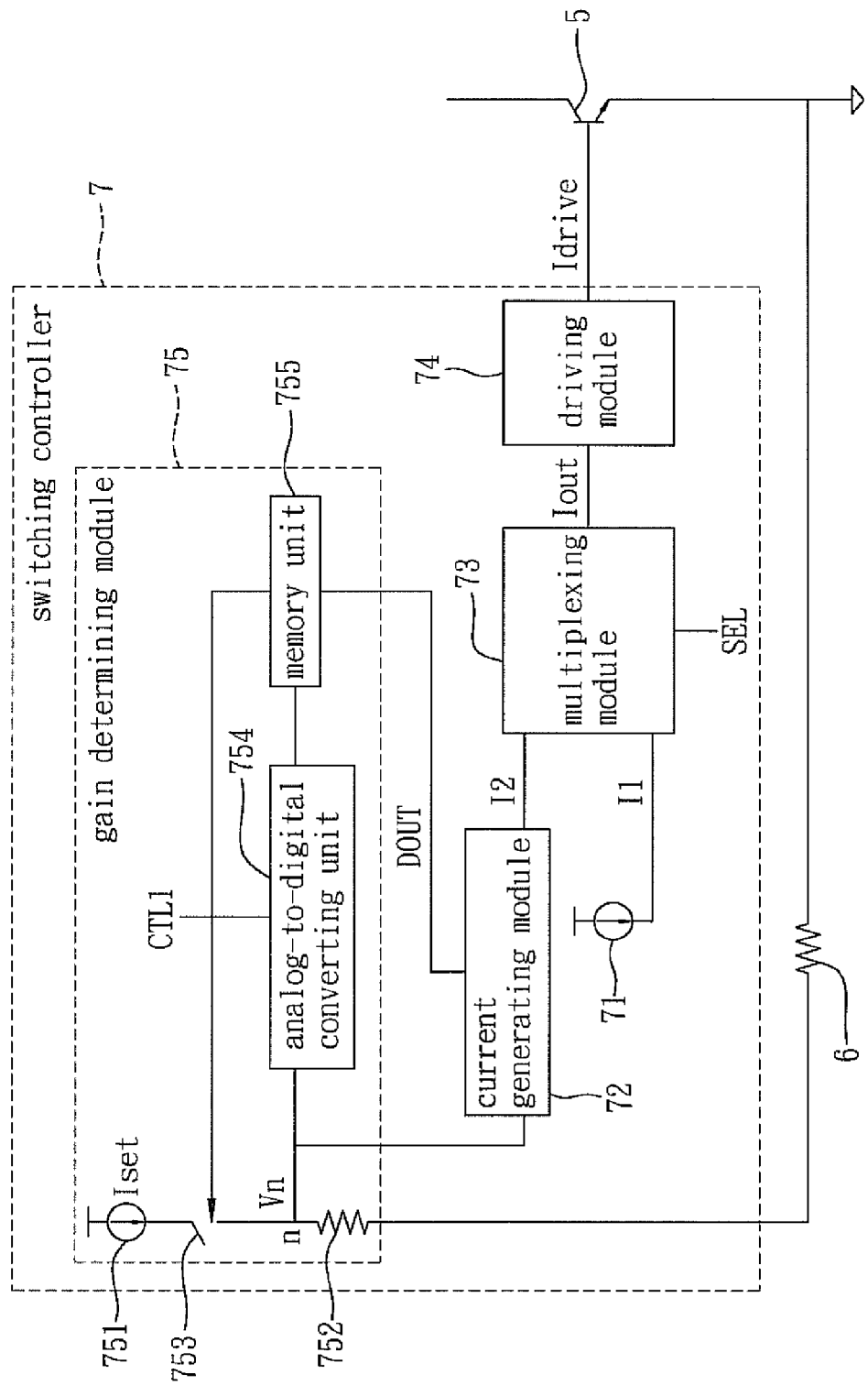
FIG. 4 is a schematic circuit diagram illustrating a switching controller of the first preferred embodiment.

The switching controller 7 is coupled between the second terminal of the current sensing resistor 6 and the base of the BJT 5. Referring to FIG. 4, in this embodiment, the switching controller 7 includes a first current source 71, a current generating module 72, a multiplexing module 73, a driving module 74, and a gain determining module 75.

The gain determining module 75 includes a second current source 751, a setting resistor 752, a switch 753, an analog-to-digital converting unit 754, and a memory unit 755. The second current source 751 supplies a setting current (Iset). The switch 753 is coupled between the second current source 751 and the setting resistor 752, and is operable between an ON state and an OFF state in response to a first control signal (CTL1). The switch 753 allows the setting current (Iset) supplied from the second current source 751 to flow therethrough when in the ON state. The setting resistor 752 is coupled between the second terminal of the current sensing resistor 6 and a common node (n) between the setting resistor 752 and the switch 753. The analog-to-digital converting unit 754 is coupled to the common node (n), and is operable in response to the first control signal (CTL1) to convert an analog voltage to a digital output when the switch 753 is in the ON state The analog voltage is identical to a potential (Vn) at the common node (n). The memory unit 755 is coupled to the analog-to-digital converting unit 754, receives and stores, in response to the first control signal (CTL1), the digital output from the analog-to-digital converting unit 754 when the switch 753 is in the ON state, and outputs the digital output (DOUT) stored therein.

The first current source 71 supplies a first current (I1). The current generating module 72 is coupled to the common node (n) for receiving an input voltage associated with the sensed voltage, and to the memory unit 755 for receiving the digital output (DOUT) therefrom. The current generating module 72 is operable to generate a second current (I2) based on the input voltage in response to receipt of the digital output (DOUT). The input voltage is identical to the potential (Vn) at the common node (n), and is a voltage across a series connection of the setting resistor 752 and the current sensing resistor 6. The multiplexing module 73 is coupled to the first current source 71 and the current generating module 72, and is operable to select one of the first and second currents (I1, I2) respectively from the first current source 71 and the current generating module 72 as an output current (Iout) in response to a selection control signal (SEL). The driving module 74 is coupled between the multiplexing module 73 and the base of the BJT 5, and is operable to control the BJT 5 to conduct or not conduct.

Figure 5:
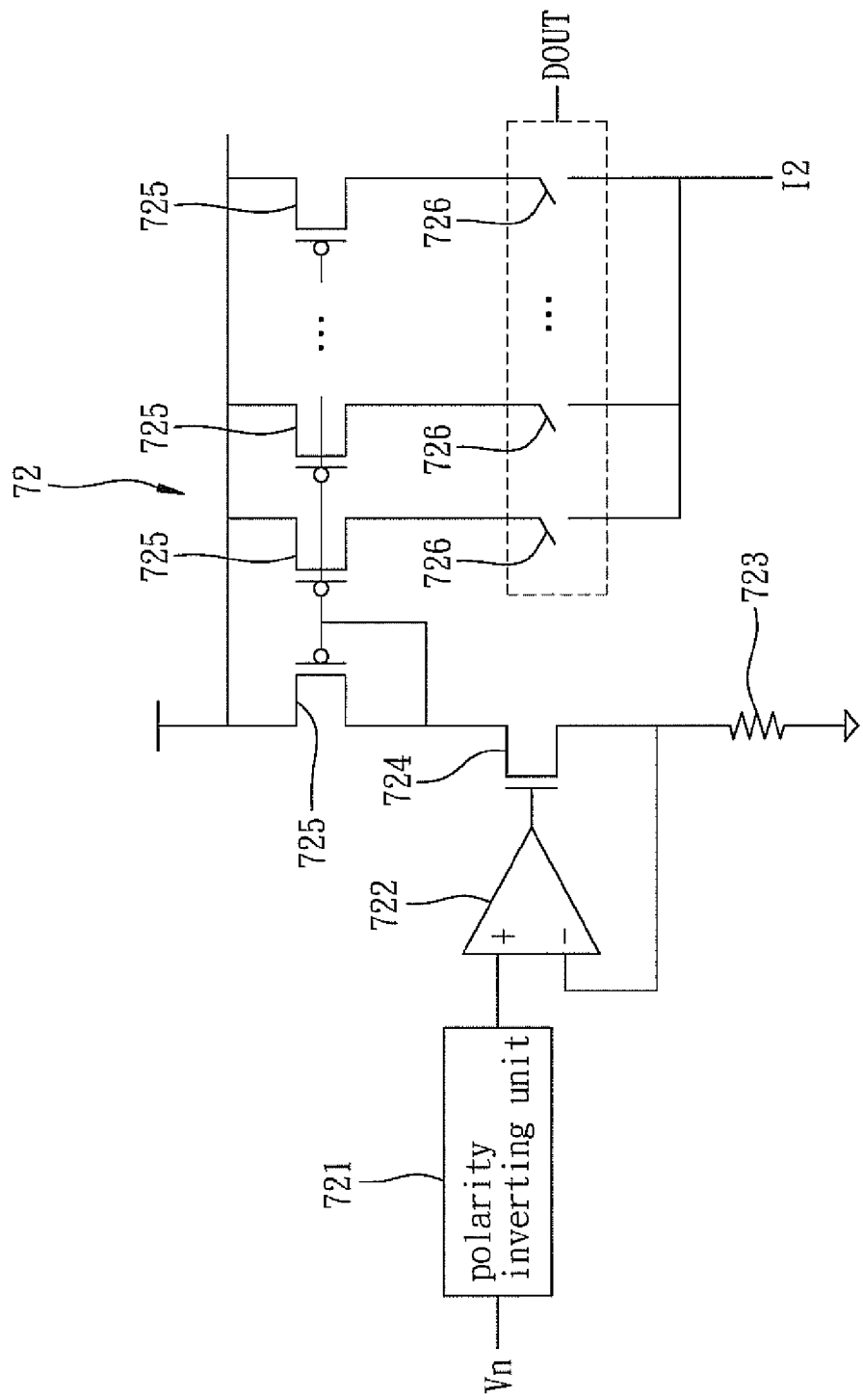
FIG. 5 is a schematic circuit diagram illustrating a current generating module of the switching controller of the first preferred embodiment.

Referring further to FIGS. 4 and 5, the current generating module 72 includes a polarity inverting unit 721, an amplifier 722, a resistor 723, an n-channel metal oxide semiconductor field effect transistor (NMOSFET) 724, a plurality of p-channel metal oxide semiconductor field effect transistors (PMOSFETs) 725, and a plurality of switches 726. The amplifier 722, the resistor 723 and the NMOSFET 724 constitute a voltage-to-current buffer. The PMOSFETs 725 and the switches 726 constitute a current mirror that has a variable gain proportional to the digital output (DOUT) from the memory unit 755. The input voltage, which is identical to the potential (Vn) at the common node (n), undergoes in sequence, polarity inversion by the polarity inverting unit 721, voltage-to-current conversion by the voltage-to-current buffer constituted by the devices 722-724, and amplification by the current mirror constituted by the devices 725, 726, so as to generate the second current (I2).

Figure 6:
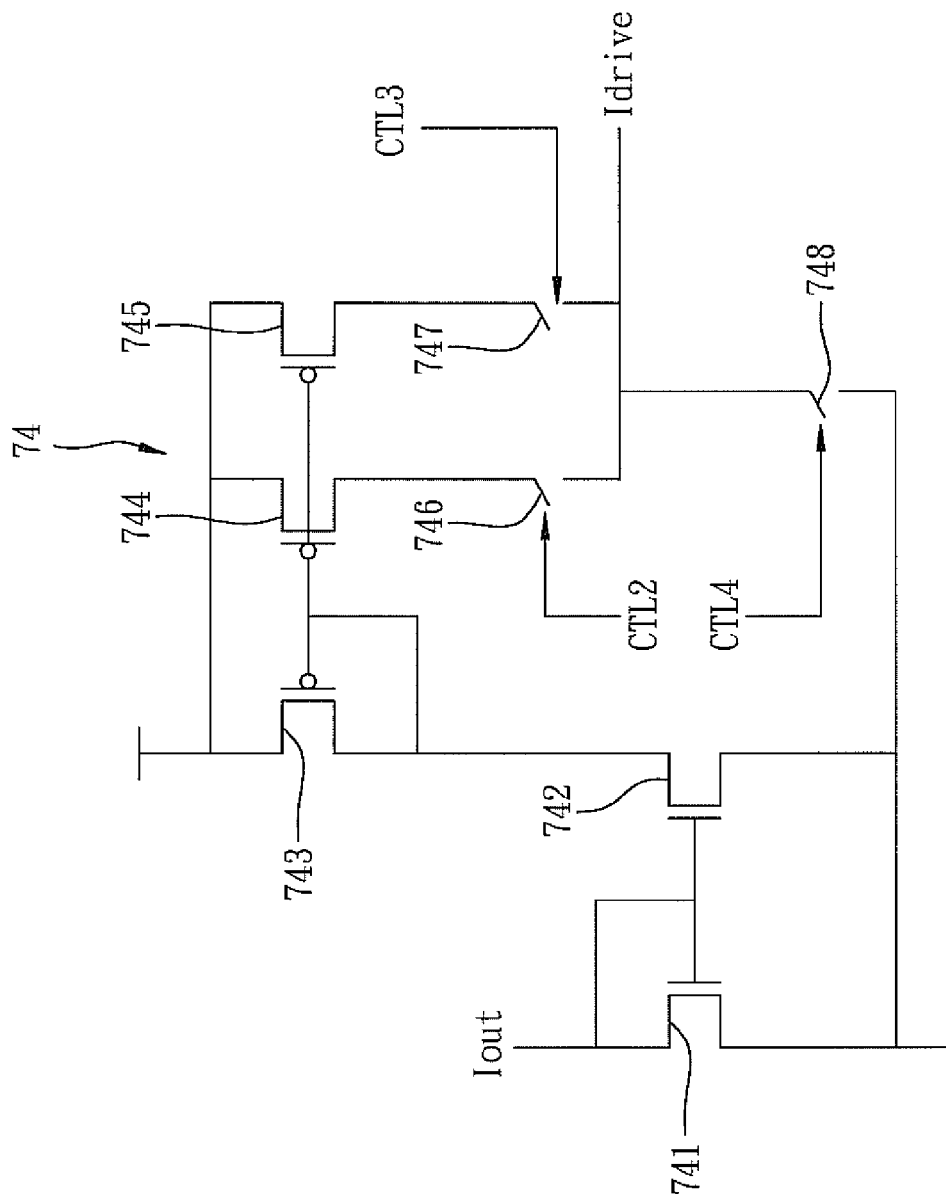
FIG. 6 is a schematic circuit diagram illustrating a driving module of the switching controller of the first preferred embodiment.

Referring to FIGS. 4 and 6, the driving module 74 includes two NMOSFETs 741, 742, three PMOSFETs 743-745, and three switches 746-748. The NMOSFETs 741, 742 constitute a first current mirror. The PMOSFETs 743-745 and the switches 746, 747 constitute a second current mirror that has a variable gain dependent on a second control signal (CTL2)

and a third control signal (CTL3). Each of the switches 746-748 is operable between an ON state and an OFF state. When at least one of the switches 746, 747 is in the ON state in response to the second control signal (CTL2) and the third control signal (CTL3) while the switch 748 is in the OFF state in response to a fourth control signal (CTL4), the output current (Iout) undergoes in sequence, amplification by the first current mirror constituted by the devices 741, 742 and amplification by the second current mirror constituted by the devices 743-747, so as to generate a driving current (Idrive) with a non-zero value. The driving module 74 outputs the driving current (Idrive) to the base of the BJT 5 such that the BJT 5 becomes conducting upon receiving the driving current (Idrive). When the switches 746, 747 are in the OFF state in response to the second control signal (CTL2) and the third control signal (CTL3) while the switch 748 is in the ON state in response to the fourth control signal (CTL4), a ground voltage is supplied to the base of the BJT 5 via the switch 748 such that the BJT 5 becomes non-conducting. In other words, the driving current (Idrive) at this time has a value of zero.

Figure 7:
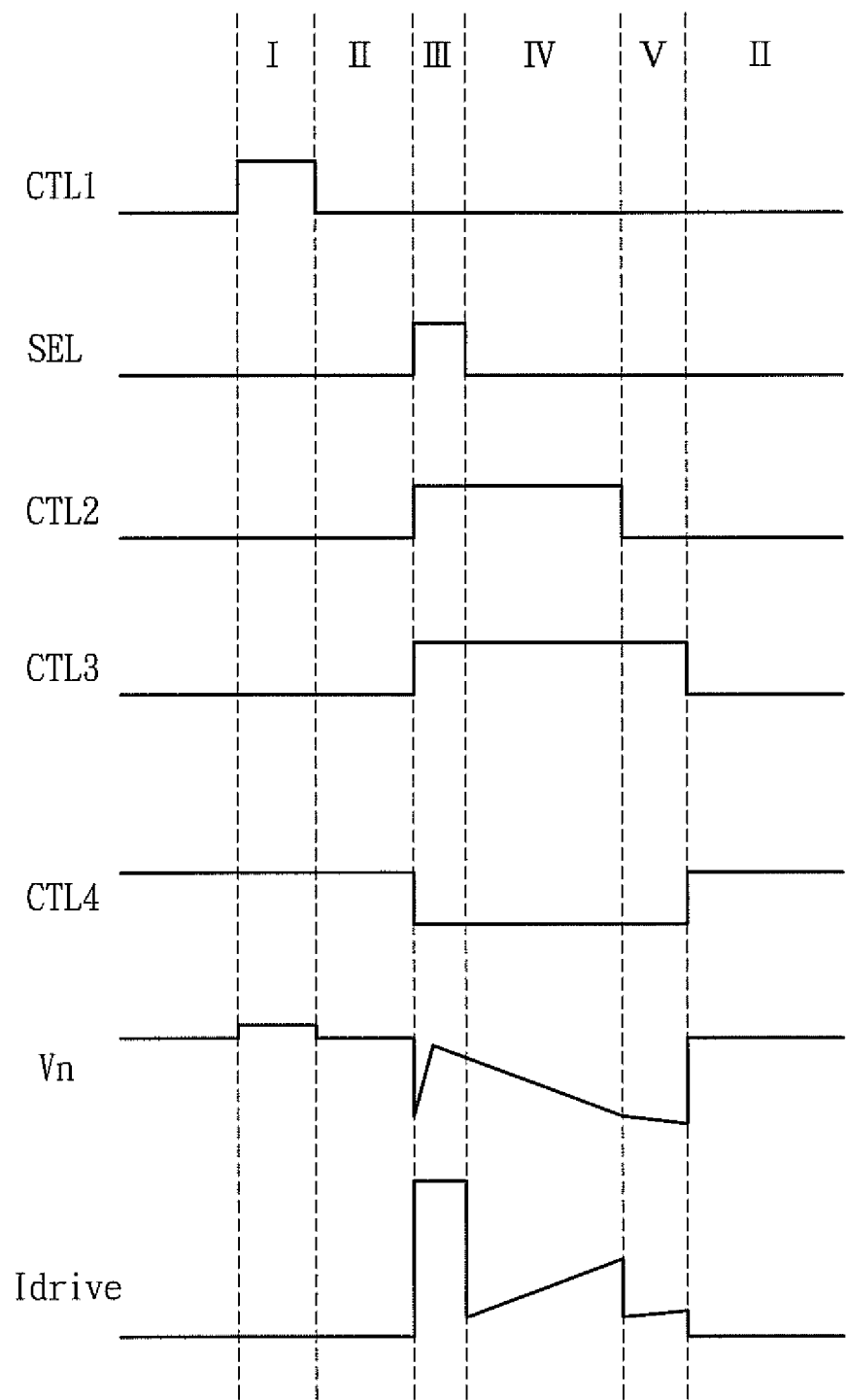
FIG. 7 is a timing diagram illustrating a first control signal (CTL1), a selection control signal (SEL), a second control signal (CTL2), a third control signal (CTL3), a fourth control signal (CTL4), a potential (Vn) and a driving current (Idrive) of the first preferred embodiment.

Referring further to FIGS. 4, 6 and 7, the switching power converting apparatus of this embodiment is operable in first to fifth phases corresponding respectively to first to fifth time periods (I-V). The second to fifth time periods (II-V) constitute a switching cycle. Each of the first to fourth control signals (CTL1-CTL4) being in a high level means that a respective one of the switches 753, 746-748 is in the ON state, whereas each of the first to fourth control signals (CTL1-CTL4) being in a low level means that the respective one of the switches 753, 746-748 is in the OFF state. The selection control signal (SEL) being in the high level means that the first current (I1) is selected as the output current (Iout), whereas the selection control signal (SEL) being in the low level means that the second current (I2) is selected as the output current (Iout).

In the first phase corresponding to the first time period (I), the switches 753, 748 are in the ON state, and the switches 746, 747 are in the OFF state. Thus, the ground voltage is supplied to the base of the BJT 5 via the switch 748 such that the BJT 5 is non-conducting. The setting current (Iset) supplied from the second current source 751 flows through the switch 753 such that the analog voltage, which is identical to the potential (Vn) at the common node (n), can be expressed by the following equation:

$$Va=Iset \times (Rset+Rcs),\qquad \text{equation 1}$$

where Va is the analog voltage, Rset is a resistance of the setting resistor 752, and Rcs is a resistance of the current sensing resistor 6. The analog voltage is converted to the digital output by the analog-to-digital converting unit 754, and the digital output from the analog-to-digital converting unit 754 is received and stored by the memory unit 755.

In application, a designer may determine the resistance of the setting resistor 752 based on a common-emitter current gain of the BJT 5. When the common-emitter current gain of the BJT 5 is large, the resistance of the setting resistor 752 should be small so that the digital output (DOUT) and thus the gain of the current mirror constituted by the devices 725, 726 are small. When the common-emitter current gain of the BJT 5 is small, the resistance of the setting resistor 752 should be large so that the digital output (DOUT) and thus the gain of the current mirror constituted by the devices 725, 726 are large.

In the second phase corresponding to the second time period (II), the switch 748 is in the ON state, and the switches 753, 746, 747 are in the OFF state. Thus, the ground voltage is supplied to the base of the BJT 5 via the switch 748 such that the BJT 5 becomes non-conducting.

In other words, in the second phase, a predetermined voltage, i.e., the ground voltage, is supplied to the base of the BJT 5 via a first conducting path provided by the conducted switch 748 so as to make the BJT 5 non-conducting. It is noted that the predetermined voltage may be different from the ground voltage as long as it is sufficient to make the BJT 5 non-conducting.

In the third phase corresponding to the third time period (III), the switches 746, 747 are in the ON state, the switches 753, 748 are in the OFF state, and the first current (I1) is selected as the output current (Iout). Thus, the driving current (Idrive) is outputted to the base of the BJT 5 such that the BJT 5 becomes conducting upon receiving the driving current (Idrive). The driving current (Idrive) is constant and can be expressed by the following equation:

$$Idrive=I1 \times K1 \times K2,\qquad \text{equation 2}$$

where K1 is a gain of the first current mirror constituted by the devices 741, 742, and K2 is the gain of the second current mirror constituted by the devices 743-747.

In other words, in the third phase, the driving current (Idrive) has a constant current component and is supplied to the base of the BJT 5 to make the BJT 5 conducting.

It is noted that the greater the driving current, the shorter the turn-on delay of the BJT 5.

In the fourth phase corresponding to the fourth time period (IV), the switches 746, 747 remain in the ON state, the switches 753, 748 remain in the OFF state, and the second current (I2) is selected as the output current (Iout) so that the BJT 5 remains conducting. The current sensing resistor 6 senses the conducting current flowing through the BJT 5 so as to produce the sensed voltage across the current sensing resistor 6. In this case, no current flows through the setting resistor 752 such that the input voltage, which is identical to the potential (Vn) at the common node (n), is equal to the sensed voltage. The driving current (Idrive) is outputted to the base of the BJT 5 to continuously maintain conduction of the BJT 5. The sensed voltage, the second current (I2) and the driving current (Idrive) can be respectively expressed by the following equations:

$$Vcs=-(Ic \times Rcs),\qquad \text{equation 3}$$

$$I2=-Vcs \div R1 \times K3 = Ic \times Rcs \div R1 \times K3,\qquad \text{equation 4}$$

$$Idrive=I2 \times K1 \times K2 = Ic \times Rcs \div R1 \times K3 \times K1 \times K2,\qquad \text{equation 5}$$

where Vcs is the sensed voltage, Ic is the conducting current flowing through the BJT 5, R1 is a resistance of the resistor 723, and K3 is the gain of the current mirror constituted by the devices 725, 726. It is known from equation 5 that the driving current (Idrive) is proportional to the conducting current flowing through the BJT 5.

In other words, in the fourth phase, the driving current (Idrive) has a current component, which is in phase with that in the third phase and is proportional to the conducting current flowing through the BJT 5, and is supplied to the base of the BJT 5 so as to maintain conduction of the BJT 5.

In the fifth phase corresponding to the fifth time period (V), the switch 747 is in the ON state, the switches 753, 746, 748 is in the OFF state, and the second current (I2) is selected as the output current (Iout). Thus, the BJT 5 remains conducting, and the current sensing resistor 6 senses the conducting current flowing through the BJT 5 so as to produce the sensed voltage across the current sensing resistor 6. In this phase, the sensed voltage can also be expressed by equation 3, and since no current flows through the setting resistor 752, the input voltage, which is identical to the potential (Vn) at the common node (n), is equal to the sensed voltage. The second current (I2) can also be expressed by equation 4. The driving current (Idrive) is outputted to the base of the BJT 5 such that the BJT 5 continuously remains conducting. The driving current (Idrive) can also be expressed by equation 5. It is known from equation 5 that the driving current (Idrive) is proportional to the conducting current flowing through the BJT 5.

In the fifth phase, the gain of the second current mirror constituted by the devices 743-747 is greater than that in the fourth phase such that the driving current (Idrive) is still proportional to the conducting current flowing through the BJT 5, but is smaller than a peak value thereof in the fourth phase. Therefore, charges accumulated in the base of the BJT 5 are released through the BJT 5 so as to shorten a turn-off delay of the BJT 5 in the next phase.

In other words, in the fifth phase, the driving current (Idrive) has a current component, which is in phase with that in the third phase and is proportional to the conducting current flowing through the BJT 5, and is supplied to the base of the BJT 5 to make the BJT 5 conducting. A gain of the current component of the driving current (Idrive) in the fifth phase to the conducting current flowing through the BJT 5 is smaller than a gain of the current component of the driving current (Idrive) in the fourth phase to the conducting current flowing through the BJT 5.

To sum up, since the current component of the driving current (Idrive) in the fourth phase is proportional to the conducting current flowing through the BJT 5, power loss of the switching power converting apparatus of this embodiment is reduced as compared to the aforesaid conventional switching power converting apparatus, thereby resulting in lower power consumption.

Figure 8:
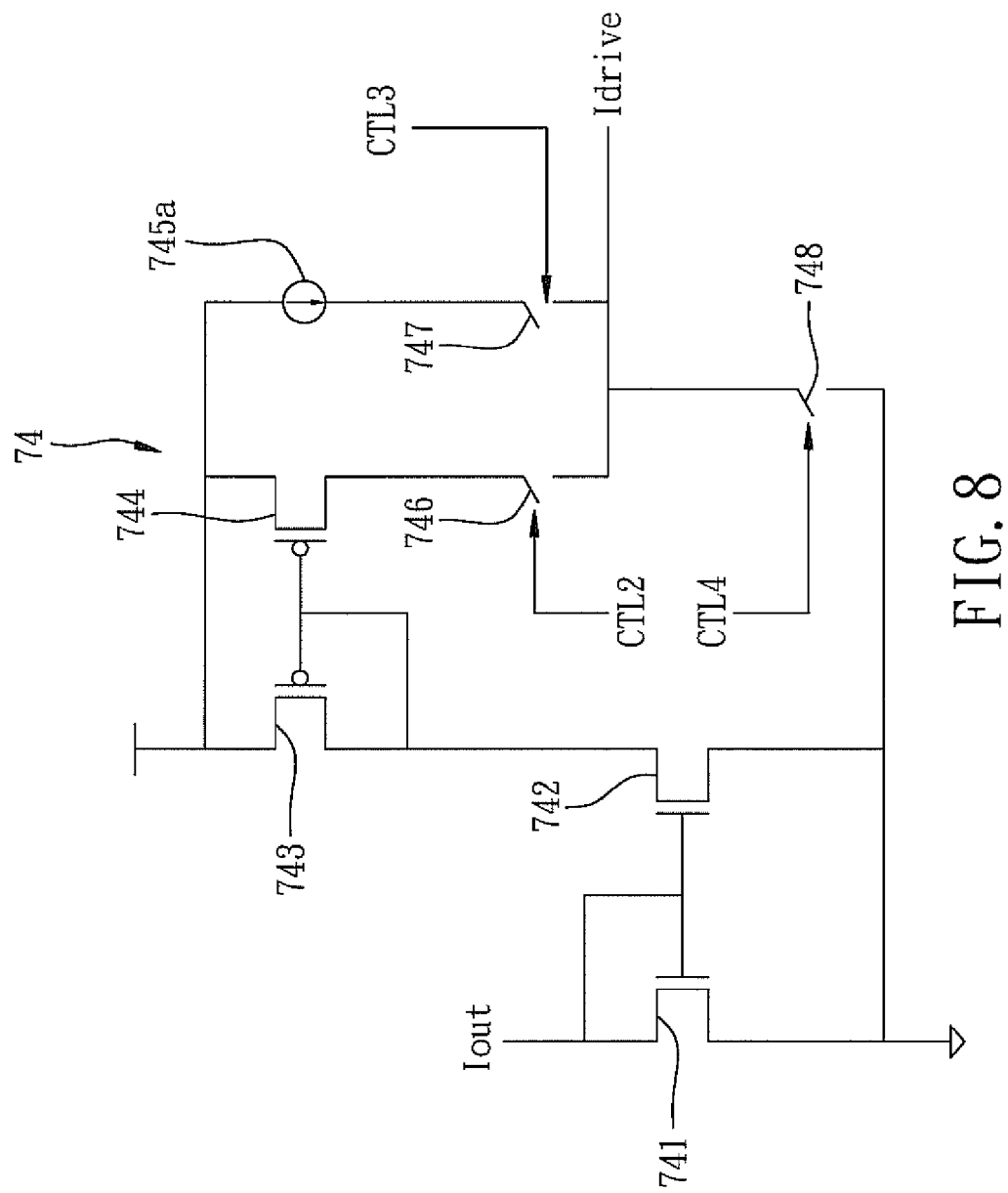
FIG. 8 is a schematic circuit diagram illustrating a driving module of the second preferred embodiment of a switching power converting apparatus according to this invention.
Figure 9:
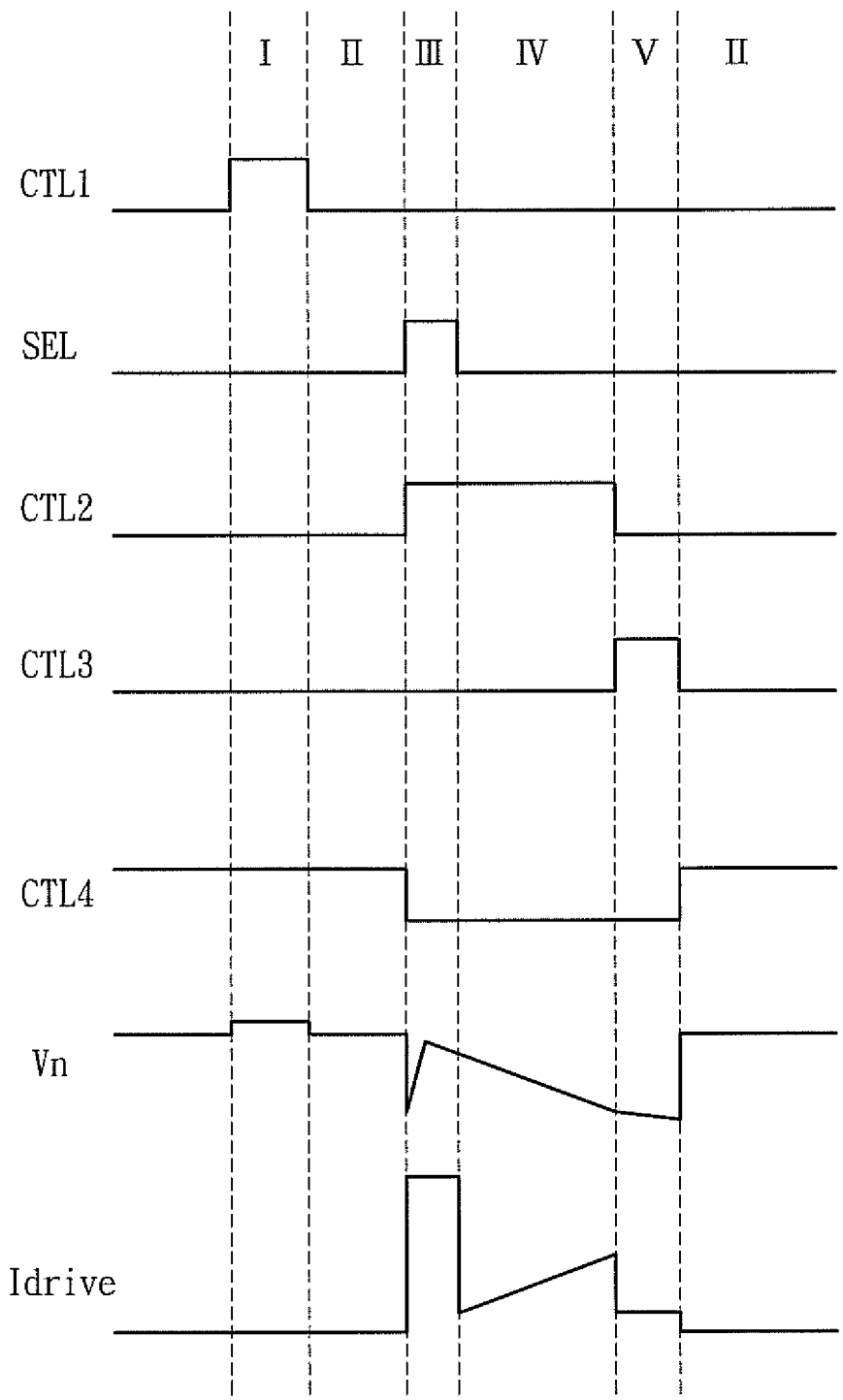
FIG. 9 is a timing diagram illustrating a first control signal (CTL1), a selection control signal (SEL), a second control signal (CTL2), a third control signal (CTL3), a fourth control signal (CTL4), a potential (Vn) and a driving current (Idrive) of the second preferred embodiment.

FIG. 8 illustrates a driving module 74 of the second preferred embodiment of a switching power converting apparatus according to this invention, which is a modification of the first preferred embodiment. The driving module 74 differs from that of the first preferred embodiment shown in FIG. 6 in that a current source 745a for supplying a current is included to substitute the PMOSFET 745 of FIG. 6. As a result, operation of the switching power converting apparatus, especially in the third to fifth phases, differs from that in the first preferred embodiment.

Referring further to FIGS. 4, 5, 8 and 9, in the third phase corresponding to the third time period (III), the switch 746 is in the ON state, the switches 753, 747, 748 are in the OFF state, and the first current (I1) is selected as the output current (Iout). Thus, the driving current (Idrive) is outputted to the base of the BJT 5 such that the BJT 5 becomes conducting upon receiving the driving current (Idrive). The driving current (Idrive) is constant, and can be expressed by the following equation:

$$Idrive = I1 \times K1 \times K2a,\qquad \text{equation 7}$$

where K2a is the gain of the second current mirror constituted by the devices 743, 744.

In the fourth phase corresponding to the fourth time period (IV), the switch 746 remains in the ON state, the switches 753, 747, 748 remain in the OFF state, and the second current (I2) is selected as the output current (Iout). Thus, the BJT 5 remains conducting, and the current sensing resistor 6 senses the conducting current flowing through the BJT 5 so as to produce the sensed voltage across the current sensing resistor 6. The sensed voltage can be expressed by equation 3. In this case, no current flows through the setting resistor 752 such that the input voltage, which is identical to the potential (Vn) at the common node (n), is equal to the sensed voltage. The second current (I2) can be expressed by equation 4. The driving current (Idrive) is outputted to the base of the BJT 5 such that the BJT 5 remains conducting. The driving current (Idrive) can be expressed by the following equation:

$$Idrive = I2 \times K1 \times K2a = Ic \times Rcs \div R1 \times K3 \times K1 \times K2a.\qquad \text{equation 8}$$

It is known from equation 8 that the driving current (Idrive) is proportional to the conducting current flowing through the BJT 5.

In the fifth phase corresponding to the fifth time period (V), the switch 747 is in the ON state, and the switches 753, 746, 748 are in the OFF state. Thus, the driving current (Idrive), which is identical to the current supplied by the current source 745a and is constant, is outputted to the base of the BJT 5 to keep the BJT 5 in conduction. In other words, the driving current (Idrive) has a constant current component in phase with that in the third phase, and is supplied to the base of the BJT 5 for conduction thereof.

Preferably, in the fifth phase, the current component of the driving current (Idrive) is smaller than a peak of the current component of the driving current (Idrive) in the fourth phase such that charges accumulated in the base of the BJT 5 are released through the BJT 5 so as to shorten a turn-off delay of the BJT 5 in the next phase.

Figure 10:
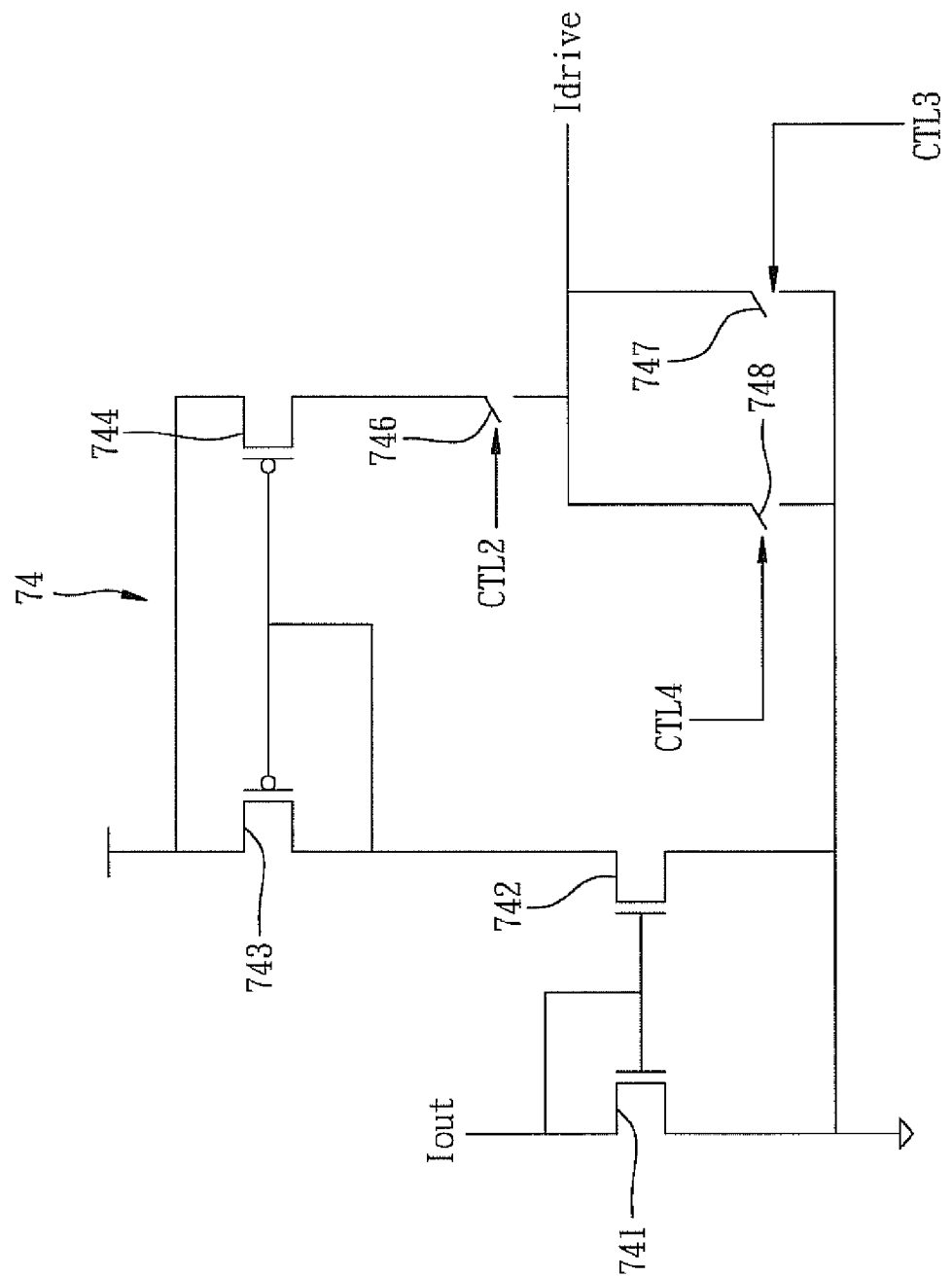
FIG. 10 is a schematic circuit diagram illustrating a driving module of the third preferred embodiment of a switching power converting apparatus according to this invention.
Figure 11:
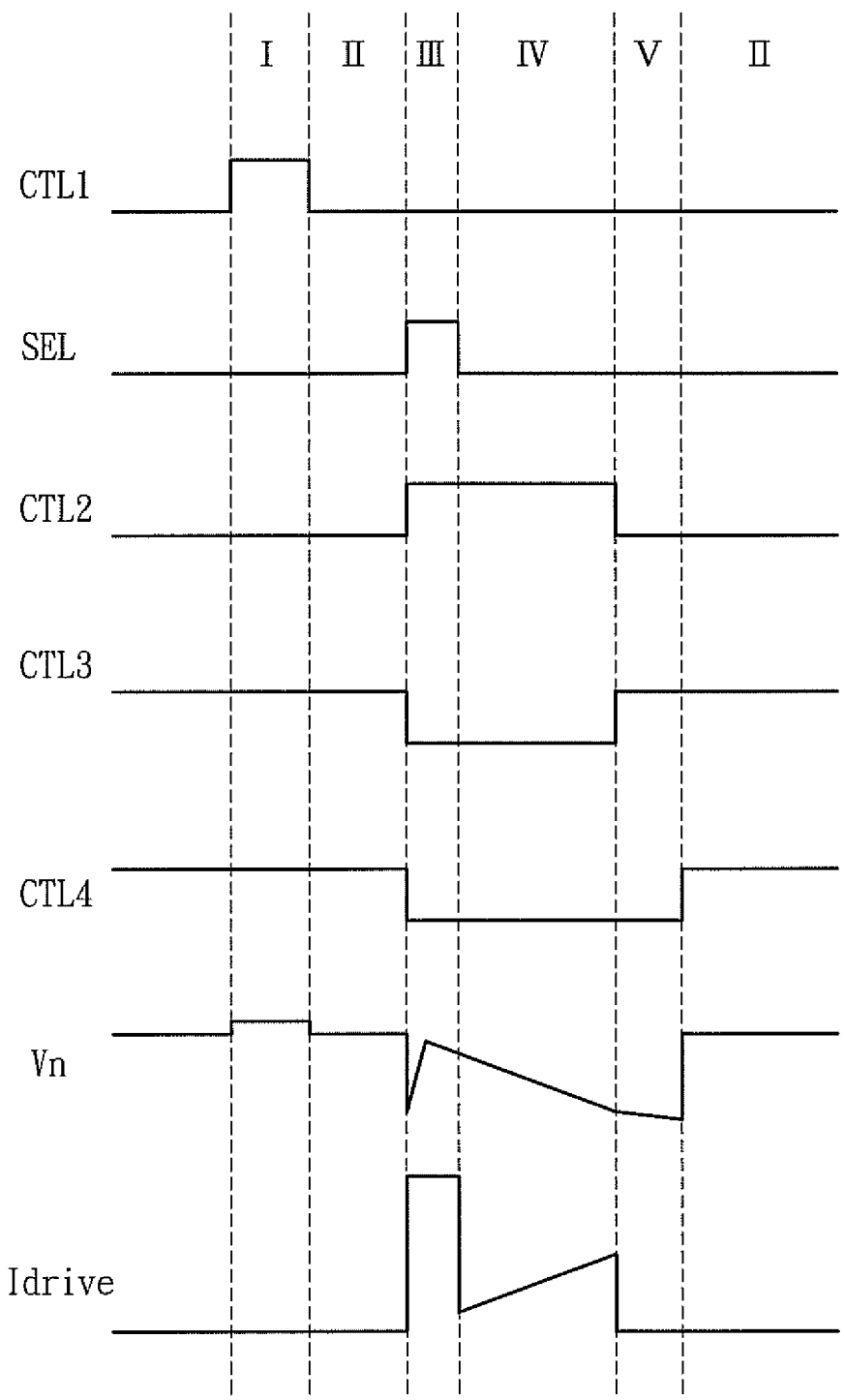
FIG. 11 is a timing diagram illustrating a first control signal (CTL1), a selection control signal (SEL), a second control signal (CTL2), a third control signal (CTL3), a fourth control signal (CTL4), a potential (Vn) and a driving current (Idrive) of the third preferred embodiment.

FIG. 10 illustrates a driving module 74 of the third preferred embodiment of a switching power converting apparatus according to this invention, which is a modification of the first preferred embodiment. The driving module 74 differs from that of the first preferred embodiment shown in FIG. 6 in that the PMOSFET 745 of FIG. 6 is omitted and that the switch 747 is coupled in parallel to the switch 748. As a result, operation of the switching power converting apparatus differs from that in the first preferred embodiment.

Referring further to FIGS. 4, 5, 10 and 11, in the first phase corresponding to the first time period (I), the switches 753, 747, 748 are in the ON state, and the switch 746 is in the OFF state. Thus, the ground voltage is supplied to the base of the BJT 5 via the switch 748 such that the BJT 5 becomes non-conducting. The setting current (Iset) supplied from the second current source 751 flows through the switch 753 such that the analog voltage, which is identical to the potential (Vn) at the common node (n), can also be expressed by equation 1. The analog voltage is converted to the digital output by the analog-to-digital converting unit 754, and the digital output from the analog-to-digital converting unit 754 is received and stored by the memory unit 755.

In the second phase corresponding to the second time period (II), the switches 747, 748 are in the ON state, and the switches 753, 746 are in the OFF state. Thus, the ground voltage is supplied to the base of the BJT 5 via the switch 748 such that the BJT 5 remains non-conducting.

In the third phase corresponding to the third time period (III), the switch 746 is in the ON state, the switches 753, 747, 748 are in the OFF state, and the first current (I1) is selected as the output current (Iout). Thus, the driving current (Idrive) is outputted to the base of the BJT 5 such that the BJT 5 becomes conducting upon receiving the driving current (Idrive). The driving current (Idrive) is constant, and can be expressed by equation 7.

In the fourth phase corresponding to the fourth time period (IV), the switch 746 remains in the ON state, the switches 753, 747, 748 remain in the OFF state, and the second current (I2) is selected as the output current (Iout). Thus, the BJT 5 remains conducting, and the current sensing resistor 6 senses the conducting current flowing through the BJT 5 so as to produce the sensed voltage across the current sensing resistor

6. The sensed voltage can be expressed by equation 3. In this case, no current flows through the setting resistor 752 such that the input voltage, which is identical to the potential (Vn) at the common node (n), is equal to the sensed voltage. The second current (I2) can be expressed by equation 4. The driving current (Idrive) is outputted to the base of the BJT 5 such that the BJT 5 continues to remain conducting. The driving current (Idrive) can be expressed by equation 8. Therefore, the driving current (Idrive) is proportional to the conducting current flowing through the BJT 5.

In the fifth phase corresponding to the fifth time period (V), the switch 747 is in the ON state, and the switches 753, 746, 748 are in the OFF state. Thus, the BJT 5 remains conducting, while the ground voltage is supplied to the base of the BJT 5 via the switch 747, such that charges accumulated in the base of the BJT 5 are released via the BJT 5 and the switch 747 so as to shorten a turn-off delay of the BJT 5 in the next phase. Preferably, the switch 747 has a conduction impedance greater than that of the switch 748.

In other words, in the fifth phase (V), a predetermined voltage, i.e., the ground voltage, is supplied to the base of the BJT 5 via a conducting path provided by the conducted switch 747. The conducting path provided by the conducted switch 747 has an impedance greater than that of a conducting path provided by the conducted switch 748.

Figure 12:
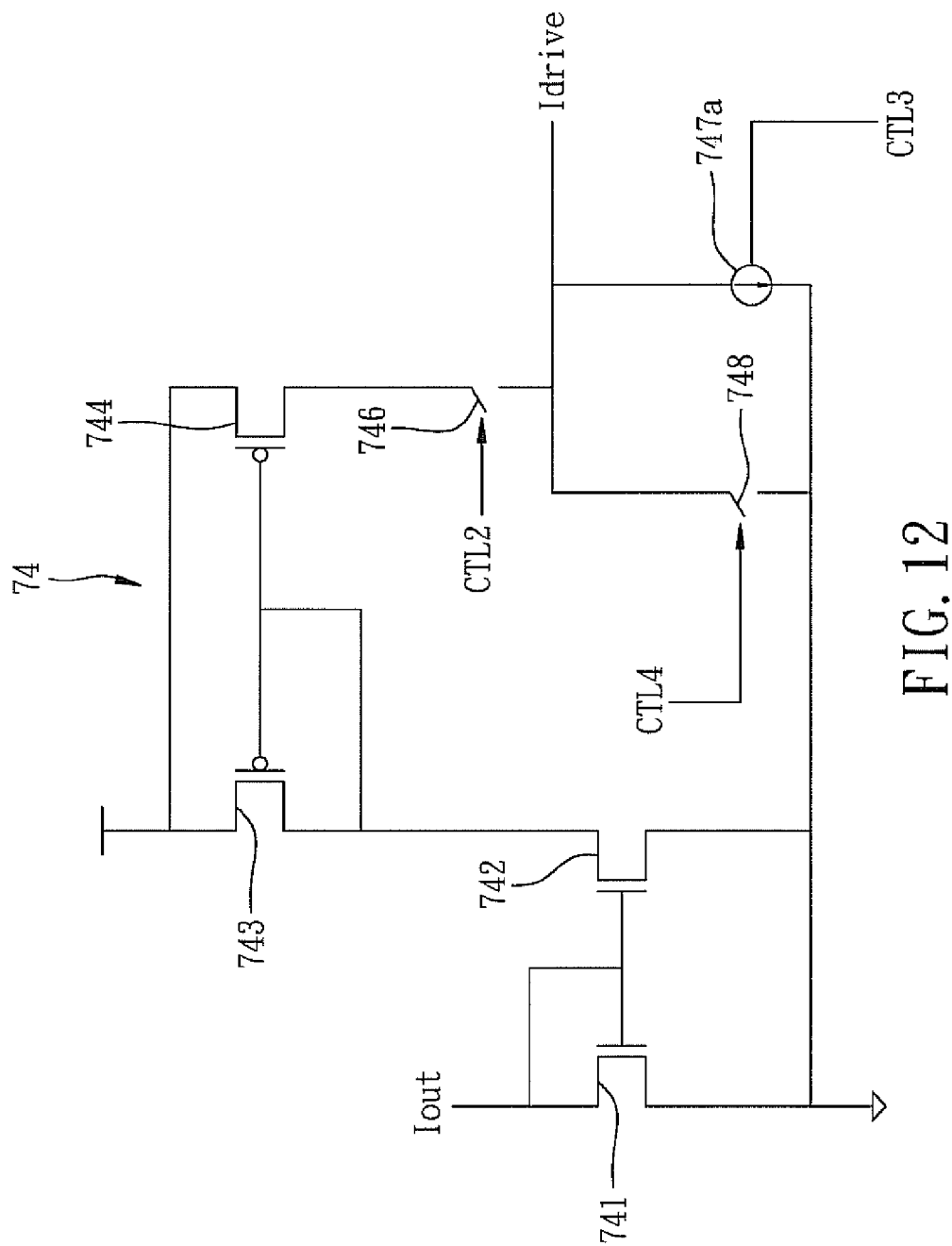
FIG. 12 is a schematic circuit diagram illustrating a driving module of the fourth preferred embodiment of a switching power converting apparatus according to this invention.

FIG. 12 illustrates a driving module 74 of the fourth preferred embodiment of a switching power converting apparatus according to this invention, which is a modification of the third preferred embodiment. The driving module 74 differs from that of the third preferred embodiment shown in FIG. 10 in that a current source 747a is included to substitute the switch 747 of FIG. 10. In this embodiment, the current source 747a is enabled to draw a constant control current or disabled from drawing the control current in response to the third control signal (CTL3). As a result, operation of the switching power converting apparatus, especially in the fifth phase, differs from that in the third preferred embodiment.

Referring further to FIGS. 4, 5, 11 and 12, the third control signal (CTL3) being in the high level means that the current source 747a is enabled to draw the control current, whereas the third control signal (CTL3) being in the low level means that the current source 747a is disabled from drawing the control current.

In the fifth phase corresponding to the fifth time period (V), the control current is drawn by the current source 747a from the base of the BJT 5 such that charges accumulated in the base of the BJT 5 are released via the BJT 5 and the current source 747a. In other words, the constant control current is out of phase with the current component of the driving current (Idrive) supplied to the base of the BJT 5 in the third phase (III), and is supplied to the base of the BJT 5 to release charges accumulated in the base of the BJT 5.

It is noted that, in other embodiments, the switching power converting apparatus can be of other types, such as forward, buck, boost and buck-boost, and the BJT 5 can be a PNP BJT. Since those skilled in the art should be familiar with modifying this disclosure to adopt other types of switching power converting apparatus or to use a PNP type BJT 5, details of the same are omitted herein for the sake of brevity. Moreover, the current generating module 72 can be coupled to the second terminal of the current sensing resistor 6 instead of the common node (n) such that the input voltage is identical to a potential at the second terminal of the current sensing resistor 6 and is a voltage across the current sensing resistor 6, i.e., the sensed voltage. Here, the setting resistor 752 is coupled between the common node (n) and the emitter of the BJT 5 such that the analog voltage is a voltage across the setting resistor 752.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A switching power converting apparatus comprising:
    a coil unit adapted to be coupled between a power source and a load;
    a bipolar junction transistor (BJT) coupled to said coil unit and operable to control power transfer from the power source to the load through said coil unit in response to conduction or non-conduction of the BJT, said BJT permitting a conducting current to flow therethrough during conduction;
    a current sensing resistor adapted to be coupled between the power source and said BJT for sensing the conducting current flowing through said BJT so as to produce a sensed voltage across said current sensing resistor; and
    a switching controller coupled between said current sensing resistor and said BJT, said switching controller including
        a first current source for supplying a first current,
        a current generating module operable to generate, based on an input voltage associated with the sensed voltage, a second current proportional to the conducting current flowing through said BJT,
        a multiplexing module coupled to said first current source and said current generating module, said multiplexing module being operable to select one of the first and second currents respectively from said first current source and said current generating module as an output current in response to a selection control signal, and
        a driving module coupled between said multiplexing module and said BJT, said driving module being operable to output to said BJT a driving current that is proportional to the output current based on the output current from said multiplexing module, said BJT conducting upon receiving the driving current from said driving module.

2. The switching power converting apparatus of claim 1, wherein a gain of the second current generated by said current generating module to the sensed voltage is variable.

3. The switching power converting apparatus of claim 2, wherein said switching controller further includes a gain determining module, said gain determining module including:
    a second current source for supplying a setting current;
    a setting resistor;
    a switch coupled between said second current source and said setting resistor and operable between an ON state and an OFF state in response to a first control signal, said switch permitting the setting current supplied from said second current source to flow therethrough when operating in the ON state;
    an analog-to-digital converting unit coupled to a common node between said setting resistor and said switch, and operable to convert an analog voltage to a digital output, the analog voltage being identical to a potential at said common node; and
    a memory unit coupled to said analog-to-digital converting unit and said current generating module, and receiving and storing the digital output from said analog-to-digital converting unit when said switch is in the ON state, said memory unit outputting the digital output stored therein to said current generating module such that said current generating module generates the second current in response to receipt of the digital output from said memory unit.

4. The switching power converting apparatus of claim 3, wherein:
said setting resistor is coupled between said common node and said current sensing resistor; and
said current generating module is coupled to said common node for receiving the input voltage, the input voltage being identical to the potential at the common node and being a voltage across a series connection of said setting resistor and said current sensing resistor.

5. The switching power converting apparatus of claim 1, wherein a gain of the driving current to the output current is variable during a period where the second current is selected by said multiplexing module as the output current.

6. The switching power converting apparatus of claim 1, wherein the driving current has a constant current component.

7. The switching power converting apparatus of claim 1, wherein said driving module is operable to supply a constant control current out of phase with the driving current to said BJT so as to release charges accumulated in said BJT.

8. The switching power converting apparatus of claim 1, wherein said driving module is operable to supply a predetermined voltage to said BJT via a first conducting path such that said BJT becomes non-conducting in response to the predetermined voltage, and is operable to supply the predetermined voltage to said BJT via a second conducting path so as to release charges accumulated in said BJT.

9. The switching power converting apparatus of claim 8, wherein said second conducting path has an impedance greater than that of said first conducting path.

10. A switching controller for a switching power converting apparatus, the switching power converting apparatus including a coil unit, a bipolar junction transistor (BJT) coupled to the coil unit for controlling power transfer from a power source to a load through the coil unit in response to conduction or non-conduction of the BJT and permitting a conducting current to flow through the BJT during conduction, and a current sensing resistor coupled to the BJT for sensing the conducting current flowing through the BJT so as to produce a sensed voltage across the current sensing resistor, said switching controller being adapted to be coupled between the BJT and the current sensing resistor, and comprising:
a current source for supplying a first current;
a current generating module operable to generate, based on an input voltage associated with the sensed voltage, a second current proportional to the conducting current flowing through the BJT;
a multiplexing module coupled to said current source and said current generating module, said multiplexing module being operable to select one of the first and second currents respectively from said current source and said current generating module as an output current in response to a selection control signal; and
a driving module coupled to said multiplexing module for receiving the output current therefrom, said driving module being adapted to be coupled to the BJT, and being operable to output to the BJT a driving current that is proportional to the output current based on the output current such that the BJT conducts upon receiving the driving current from said driving module.

11. A method of controlling a bipolar junction transistor (BJT) of a switching power converting apparatus, switching of the BJT between conduction and non-conduction being related to power transfer of the switching power converting apparatus, the BJT permitting a conducting current to flow therethrough during conduction, said method comprising the steps of:
(a) supplying a predetermined voltage to the BJT via a first conducting path to make the BJT non-conducting;
(b) supplying a constant first current to the BJT to make the BJT conducting; and
(c) supplying a second current to the BJT to make the BJT conducting, the second current being in phase with the first current and being proportional to the conducting current flowing through the BJT.

12. The driving method of claim 11, further comprising the step of:
(d) supplying a third current to the BJT to make the BJT conducting, the third current being in phase with the first current and being proportional to the current flowing through the BJT, a gain of the third current to the conducting current flowing through the BJT being smaller than a gain of the second current to the conducting current flowing through the BJT.

13. The driving method of claim 11, further comprising the step of:
(d) supplying a constant third current to the BJT to make the BJT conducting, the third current being in phase with the first current and being smaller than a peak of the second current.

14. The driving method of claim 11, further comprising the step of:
(d) supplying the predetermined voltage to the BJT to release charges accumulated in the BJT via a second conducting path, the second conducting path having an impedance greater than that of the first conducting path.

15. The driving method of claim 11, further comprising the step of:
(d) supplying a constant control current out of phase with the first current to the BJT to release charges accumulated in the BJT.

* * * * *